United States Patent Office 3,775,465
Patented Nov. 27, 1973

3,775,465
ORGANIC TETRAPEROXIDES
Egeo Sacrini and Claudio Cavallotti, Milan, Italy, assignors to The B. F. Goodrich Company, Akron, Ohio
No Drawing. Filed Aug. 7, 1970, Ser. No. 62,128
Claims priority, application Italy, Aug. 12, 1969,
20,839/69
Int. Cl. C07c 73/00
U.S. Cl. 260—475 SC                    3 Claims

ABSTRACT OF THE DISCLOSURE

Tetraperoxides of the formula

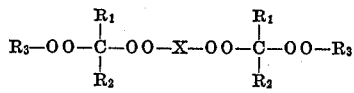

where X is a bivalent radical such as alkylene; $R_1$ is hydrogen or an organic radical; $R_2$ is alkylene alkoxy carbonyl; and $R_3$ is an organic radical. Method of preparing tetraperoxides by addition reaction between a bis-hydroperoxide and a carbonyl compound to form a dihydroxy diperoxide, followed by condensation of the dihydroxy diperoxide with a tertiary monohydroxide. The tetraperoxides are useful for vulcanizing saturated elastomers, crosslinking plastomers, and initiating radical polymerization.

BACKGROUND OF THE INVENTION

(1) Field of the invention

The present invention relates to a new series of organic peroxides. More particularly, it relates to a process for the preparation of peroxides having four peroxidic functions, to novel peroxides having four peroxidic functions, and to the use of such peroxides as radical polymerization initiators, vulcanizing agents for elastomers, crosslinking agents for plastomers, and as organic reactants.

(2) Description of the prior art

It is well known that organic compounds of a peroxidic nature are important as generators of free radicals and consequently as initiators of free radical polymerizations, as crosslinking agents for plastomers and as vulcanizing agents for elastomers.

THE INVENTION

The present invention provides a particular type of new organic peroxides having good stability and low volatility at temperatures higher than room temperature, such peroxides being particularly suitable for use as both vulcanizers for elastomers and as crosslinking agents for plastomers.

The present invention provides a new series of organic peroxides characterized by the presence of four peroxidic groups, these peroxides being defined by the general formula:

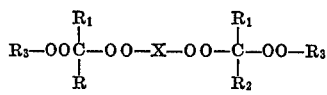

wherein:

each of $R_1$ is hydrogen alkyl, haloalkyl, cycloalkyl, halocycloalkyl or alkylcycloalkyl groups having 1–15 carbon atoms; aryl, haloaryl or alkaryl groups having 6–15 carbon atoms; oxyalkyl, oxyalkylaryl or oxycycloalkyl groups having 1–15 carbon atoms; each of $R_2$ is carbalkoxy alkylene wherein each alkylene group and each alkoxy group has 1 to 4 carbon atoms such as methylene ethoxy carbonyl,

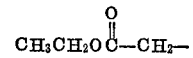

or the like;

each of $R_3$ is alkyl or haloalkyl groups having 4–12 carbon atoms; cycloalkyl, halocycloalkyl or alkylcycloalkyl groups having 4–21 carbon atoms; aryl, alkaryl or haloaryl groups having 6–24 carbon atoms; oxyalkyl, oxyalkylaryl or oxycycloalkyl groups having 4–24 carbon atoms; or an acyl group having 6–12 carbon atoms; preferred groups being tertiary alkyl such as tert.-butyl, tert.-amyl, and cumyl; and X is alkylene, haloalkylene or arylalkylene groups having 2–18 carbon atoms; alkenylene, halo-alkenylene or arylalkenylene groups having 2–18 carbon atoms; alkinylene, haloalkinylene or aryl alkinylene groups having 2–18 carbon atoms; oxyalkylene groups having 2–12 carbon atoms; arylene, alkyl arylene or halo arylene groups having 6–18 carbon atoms.

Examples of compounds within the above cited general formula include:

(1) α-α'-[2-tert.-butyl peroxy-(3-ethoxycarbonyl)-isopropylidene-2-peroxy]-1,3-diisopropylbenzene,
(2) α-α'-[2-tert.-butyl peroxy-(3-ethoxycarbonyl)-isopropylidene-2-peroxy]-1,4-diisopropylbenzene,
(3) α-α'-[2-cumyl peroxy-(3-ethoxycarbonyl)-isopropylidene-2-peroxy]-1,3-diisopropylbenzene,
(4) α-α'-[2-cumyl peroxy-(3-ethoxycarbonyl)-isopropylidene-2-peroxy]-1,4-diisopropylbenzene.

The peroxides of this invention have the unusual properties of being endowed with good stability and low volatility at temperatures higher than room temperature. These properties permit the compounds to be readily incorporated into both plastomers as crosslinking agents, and elastomers as vulcanizing agents, without giving rise to troublesome secondary phenomena.

This invention provides, moreover, a process for the preparation of the foregoing proxides, as well as of other known tetraperoxides, e.g., those disclosed in U.S. Pat. 3,489,730 at column 1, lines 41–59, the contents of which are incorporated herein by reference, through two successive steps. In the first step there occurs an addition reaction between a bis-hydroperoxide and a carbonyl compound, with the formation of a diperoxide having a double hydroxy function. In the second step there occurs a condensation reaction between the previously obtained diperoxide and a mono-hydroperoxide of the tertiary type.

According to a preferred embodiment, the desired tetraperoxides are prepared in the presence of a suitable solvent by reacting in the first step (1) an organic carbonyl compound of the formula: $R_1$—CO—$R_2$, wherein each of $R_1$ and $R_2$ are hydrogen; alkyl, haloalkyl, cycloalkyl, halocycloalkyl or alkylcycloalkyl groups having 1–15 carbon atoms; aryl haloaryl or alkaryl groups having 6–15 carbon atoms; oxyalkyl, oxyalkylaryl or oxycycloalkyl groups having 1–15 carbon atoms; $R_2$ may also be an carbalkoxy alkylene wherein each alkylene group and each alkoxy has 1 to 4 carbon atoms; or $R_1$ and $R_2$ together with the central carbon atom form a cycloaliphatic ring, having 4–16 carbon atoms, said ring being alkyl, halogen, or hydroxy substituted and having 1–8 carbon atoms, with (2) a bis-hydroperoxide of the formula: HOO—X—OOH, in which X has the previously defined meaning, the reaction being carried out in the presence of a suitable dehydrating agent and an acid catalyst, at a temperature of from about $-30°$ to $+80°$ C., preferably from about $-10°$ C. to $+50°$ C.

The compound thus obtained is a diperoxide of the formula:

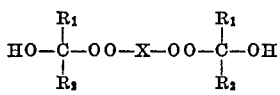

wherein $R_1$ and $R_2$ and X have the previously defined meanings.

Examples of compounds embraced by the above formula include:

(a) α-α'-(2-hydroxy-isopropylidene-2-peroxy)-1,3-diisopropylbenzene;
(b) α-α'-(2-hydroxy-isopropylidene-2-peroxy)-1,4-diisopropylbenzene;
(c) α-α'-(2-hydroxy-2-phenylethyl-2-indene-peroxy)-1,3-diisopropylbenzene;
(d) α-α'-[2-hydroxy-(3-ethoxycarbonyl)-isopropylidene-2-peroxy]-1,3-diisopropylbenzene;
(e) α-α'-[2-hydroxy(3-ethoxycarbonyl)-isopropylidene-2-peroxy]-1,3-diisopropylbenzene;
(f) α-α'-(1-hydroxy-cyclopentylidene-1-peroxy)-1,3-diisopropylbenzene;
(g) α-α'-(1-hydroxy-cyclopentylidene-1-peroxy)-1,4-diisopropylbenzene;
(h) α-α'-(1-hydroxy-cyclohexylidene-1-peroxy)-1,3-diisopropylbenzene;
(i) α-α'-(1-hydroxy-cyclohexylidene-1-peroxy)-1,4-diisopropylbenzene;
(j) α-α'-(1-hydroxy-4-tert.-butyl-cyclohexylidene-1-peroxy)-1,3-diisopropylbenzene;
(k) α-α'-(1-hydroxy-4-tert.-butyl-cyclohexylidene-1-peroxy)-1,4-diisopropylbenzene;
(l) α-α'-(1-hydroxy-cyclododecylidene-1-peroxy)-1,3-diisopropylbenzene;
(m) α-α'-(1-hydroxy-cyclododecylidene-1-peroxy)-1,4-diisopropylbenzene;
(n) α-α'-(2-hydroxy-n-butyliden-2-peroxy)-1,3-diisopropylbenzene;
(o) α-α'-(4-hydroxy-2,6,8-trimethyl nonylidene-4-peroxy)-1,3-diisopropylbenzene;
(p) α-α'-[2-hydroxy-(3-phenyl)-propylidene-2-peroxy]-1,3-diisopropylbenzene.

The peroxides defined by the foregoing formula are new compounds, and are useful as initiators of radical polymerizations.

The diperoxides obtained as described above are then reacted in the second step of the process, with mono-hydroperoxides in the presence of suitable dihydrating agents and acidic catalysts at a temperature between about $-30°$ and $+80°$ C., preferably between about $-10°$ and $+50°$ C.

Examples of bis-hydroperoxides which are suitable for use in the first step of the process include:

diisopropylbenzene-1,3-dihydroperoxide;
diisopropylbenzene-1,4-dihydroperoxide;
2,5-dimethyl-2,5-dihydroperoxy-hexane;
2,5-dimethyl-2,5-dihydroperoxide-hexene-3;
2,5-dimethyl-2,5-dihydroperoxy-hexyne-3; etc.

Examples of carbonyl compounds suitable for use in the first step of the process include: aliphatic ketones such as methyl ethyl ketone, acetone; substituted aliphatic ketones such as ethyl-acetacetate; cyclo-ketones such as cyclopentanone, cyclohexanone and cyclododecanone; cyclo-alkyl-ketones such as 4 - terbutyl cyclohexanone; alkylarylaldehydes such as cinnamaldehyde; alkylheterocyclic aldehydes such as furyl acrylic aldehyde.

The mono-hydroperoxides which may be used in the second step of the process are of the type: $R_3$—OOH wherein $R_3$ has the above defined meaning, preferably wherein a tertiary carbon atom is bound to the hydroperoxide group. Examples of such mono-hydroperoxides include: tert.-butyl hydroperoxide and substituted tert.-butyl hydroperoxides, cumyl hydroperoxide and substituted cumyl hydroperoxides, methyl-cyclohexyl hydroperoxide, 2 - methyl - 2-hydroperoxide-butyn-3, menthane hydroperoxide, etc.

Solvents suitable for use in this invention include linear aliphatic hydrocarbons having 6–10 carbon atoms; linear aliphatic halogenated hydrocarbons having 1 or 2 carbon atoms and 1 to 4 chlorine atoms cycloaliphatic hydrocarbons having 6–10 carbon atoms aromatic hydrocarbons having 6–9 carbon atoms, which may be halogenated with 1 tor 2 chlorine atoms ethers for instance, ethyl ether.

The molar ratio between the bis-hydroperoxide and the carbonyl compound used in the addition reaction should be between 1:1.2 and 1:10, and preferably between 1:1.5 and 1:5. Catalysts of an acid nature may be of the HCl, $H_2SO_4$ and $HClO_4$ type.

For the second step of the process, wherein a condensation reaction takes place, the molar ratio of diperoxide having a double hydroxy function to mono-hydroperoxide should be between 1:2 and 1:10, and preferably between 1:3 and 1:5.

As previously noted, the overall process of this invention can be employed to prepare a wide variety of tetraperoxides, many of which are known and many of which are new. Examples of tetraperoxides which can be made by the process of this invention include the following:

(1) α-α'-(2-cumyl peroxy-isopropylidene-2-peroxy)-1,3-diisopropylbenzene;
(2) α-α'-(2-cumyl peroxy-isopropylidene-2-peroxy)-1,4-diisopropylbenzene;
(3) α-α'-(2-tert.-butyl-peroxy-2-phenyl ethyl-2-idene-2-peroxy)-1,3-diisopropylbenzene;
(4) α-α'-(2-tert.-butyl-peroxy-2-phenyl ethyl-2-idene-2-peroxy)-1,4-diisopropylbenzene;
(5) α-α'-(2-cumyl peroxy-2-phenyl ethyl-2-idene-2-peroxy)-1,3-diisopropylbenzene;
(6) α-α'-(2-cumyl peroxy-2-phenyl ethyl-2-idene-2-peroxy)-1,4-diisopropylbenzene;
(7) α-α'-[2-tert.-butyl peroxy-(3-ethoxycarbonyl)isopropylidene-2-peroxy]-1,3-diisopropylbenzene;
(8) α-α'-[2-tert.-butyl peroxy-(3-ethoxycarbonyl)isopropylidene-2-peroxy]-1,4-diisopropylbenzene;
(9) α-α'-[2-cumyl peroxy-(3-ethoxycarbonyl)-isopropylidene-2-peroxy]-1,3-diisopropylbenzene;
(10) α,α'-[2-cumyl peroxy-(3-ethoxycarbonyl)-isopropylidene-2-peroxy]-1,4-diisopropylbenzene;
(11) α-α'-(1-tert.-butyl peroxy-cyclopentylidene-1-peroxy)-1,3-diisopropylbenzene;
(12) α-α'-(1-tert.-butyl peroxy-cyclopentylidene-1-peroxy)-1,4-diisopropylbenzene;
(13) α-α'-(1-cumyl peroxy-cyclopentylidene-1-peroxy)-1,3-diisopropylbenzene;
(14) α-α'-(1-cumyl peroxy-cyclopentylidene-1-peroxy)-1,4-diisopropylbenzene;
(15) α-α'-(1-tert.butyl peroxy-cyclohexylidene-1-peroxy)-1,3-diisopropylbenzene;
(16) α-α'-(1-tert.-butyl peroxy-cyclohexylidene-1-peroxy)-1,4-diisopropylbenzene;

(17) α-α′-(1-cumyl peroxy-cyclohexylidene-1-peroxy)-1,3-diisopropylbenzene;
(18) α-α′-(1-cumyl peroxy-cyclohexylidene-1-peroxy)-1,4-diisopropylbenzene;
(19) α-α′-(1-tert.-butyl peroxy-4-tert.-butyl-cyclohexylidene-1-peroxy)-1,3-diisopropylbenzene;
(20) α-α′-(1-tert.-butyl peroxy-4-tert.-butyl-cyclohexylidene-1-peroxy)-1,4-diisopropylbenzene;
(21) α-α′-(1-tert.-butyl peroxy-cyclododecylidene-1-peroxy)-1,3-diisopropylbenzene;
(22) α-α′-(1-tert.butyl peroxy-cyclododecylidene-1-peroxy)-1,4-diisopropylbenzene;
(23) α-α′-(2-tert.-butyl peroxy-n-butylidene-2-peroxy)-1,3-diisopropylbenzene;
(24) α-α′-(4-tert.-butyl peroxy-2,6,8-trimethyl nonylidene-4-peroxy)-1,3-diisopropylbenzene;
(25) α-α′-[2-tert.-butyl peroxy-(3-phenyl) propylidene-2-peroxy]-1,3-diisopropylbenzene;
(26) α-α′-[1-cumyl-peroxy-(4-tert.-butyl) cyclohexylidene-1-peroxy]-1,3-diisopropylbenzene.

Both the hydroxyl diperoxides and the tetraperoxides obtained according to this invention are soluble in aliphatic and aromatic hydrocarbons, chlorinated aliphatic and aromatic solvents, aliphatic alcohols, and aliphatic esters.

According to another and particularly interesting aspect of this invention, it has been found that the peroxides of this invention act as excellent vulcanizing agents for saturated elastomers, crosslinking agents for plastomers, and as initiators for radical polymerizations.

Vulcanization of ethylene-propylene copolymers is carried out at a temperature between about 140° and 190° C., preferably between about 150° and 180° C., for periods of from about 5 to 200 minutes, preferably between about 5 and 15 minutes.

The concentration by weight of the peroxide should be between about 0.5% and 10%, preferably between about 2% and 5%, based on the elastomer.

A particularly suitable vulcanization recipe is the following:

| | Parts |
|---|---|
| Ethylene/propylene copolymer | 100 |
| Carbon black | 20–80 |
| ZnO | 1–10 |
| Sulfur | 0.15–0.5 |
| Peroxide | 0.005–0.02 |

The use of the peroxides of the invention as cross-linking agents for plastomers finds specific application for polyolefins, paraticularly polyethylene, inasmuch as its mechanical resistance at high temperatures is improved, its brittleness at low temperatures is decreased, and its solubility in aliphatic hydrocarbons, aromatic hydrocarbons, and chlorinated hydrocarbons is decreased. Moreover, the resistance of the polymer to light, to weather and aging is improved.

The crosslinking is carried out at a temperature between about 100° and 200° C., preferably between about 145° and 165° C., at a pressure between about 50–200 kg./cm.$^2$, for a period of time of from about 5 to 60 minutes, preferably from about 10 to 30 minutes.

The concentration by weight of the peroxide is between about 0.5 and 10%, preferably between about 2 and 5%, based on the plastomer.

The most significant advantages offered by the use of the peroxides according to this invention in the vulcanization of saturated elastomers and in the crosslinking of plastomers, are:

(1) The capability of obtaining virtually odorless vulcanized and crosslinked products;
(2) Absence of blooming phenomena;
(3) Short vulcanization times and low vulcanization temperatures;
(4) Improved effectiveness remains unchanged even in the presence of conventional additives such as fillers, reinforcing agents, additives, co-agents, plasticizers, pigments and anti-oxidants.

The following examples further illustrate the invention. All parts are by weight unless otherwise stated.

EXAMPLE 1

200 cc. of ethyl ether, 60.6 g. of 1,3-diisopropylbenzene-bis-hydroperoxide-sodium salt at 67%, 51 g. of cyclopentanone at 99% and 20 g. of ground anhydrous calcium chloride, were introduced into a flask provided with a stirrer.

This mixture was cooled down to from −15°–10° C. and over a 20 minute period there were slowly introduced 60 g. of HCl at 36%. The mixture was then stirred for 1 hour at −5° C. The ether solution was then washed with water and treated with anhydrous sodium sulfate.

The α,α′-(1-hydroxy-cyclopentylidene-1-peroxy)-1,3-diisopropylbenzene thus obtained (53 g. determined analytically) showed the following characteristics:

Iodometric titer: 98%
Half life: 30 minutes at 98° C.
Decomposition temperature: 45° C.
C (percent): found 66.40 (calculated 66.98)
H (percent): found 8.2 (calculated 8.69)

In a 10% toluene solution after 80 hrs. at 40° C. no degradation occurred.

EXAMPLE 2

53 g. of α,α′-(1-hydroxy-cyclopentylidene-1-peroxy)-1,3-diisopropylbenzene obtained according to Example 1 and dissolved in 200 cc. of ethyl ether, 44 g. of tert. butyl hydroperoxide at 80%, and 40 g. of ground anhydrous calcium chloride, were introduced into a flask provided with a stirrer.

The ether solution was then cooled down to −10° C. and over a 5 minute period there were introduced 20 g. of hydrochloric acid at 36%. The temperature was permitted to rise to 0° C. and the solution was stirred for 1 hour at 0° C.

The ether phase was then washed, first with water, then with NaOH at 5%, and then again with water. The solvent was then removed under vacuum at 30° C., thereby obtaining 69 g. of product, namely, α,α′-(1-tert.-butyl peroxy-cyclopentylidene - 1 - peroxy)-1,3-diisopropylbenzene.

The product thus obtained showed the following characteristics:

$d^{25}$: 0.945
$n_D^{25}$: 1.447
Iodometric titer: 99%
Decomposition temperature: 114° C.
Half life at 123° C.: 30 minutes
C (percent): found 66.5 (calculated 66.88)
H (percent): found 9.4 (calculated 9.36)

EXAMPLE 3

300 cc. of ethyl ether, 41.8 g. of 1,4-diisopropylbenzene bis-hydroperoxide at 97.3%, 37.8 g. of 4-tert-butyl-cyclohexanone at 98%, and 18 g. of ground anhydrous calcium chloride were introduced into a flask provided with a stirrer.

The mixture was then cooled down to 0° C. and over a 5 minute period there were introduced 24 g. of HCl at 36%. The temperature was maintained at 0° C. and the mixture was kept under stirring for 1 hour.

The ether solution was then washed with water and then concentrated under vacuum, avoiding completely evaporation of the ether.

The α-α'-(1-hydroxy - 4 - tert.-butyl-cyclohexylidene-1 peroxy)-1,4-diisopropylbenzene thus obtained (66 g. determined analytically) was kept in solution so as to be ready for subsequent reaction, and showed the following characteristics:

Iodometric titer: 98.5%
Decomposition temperature: 62° C.
Half-life at 112° C.: 30 minutes
C (percent): found 70.4 (calculated 71.87)
H (percent): found 10.1 (calculated 10.18)

EXAMPLE 4

150 g. of ether solution containing 66 g. of α-α'-(1-hydroxy - 4 - tert.-butyl-cyclohexylidene-1-peroxy)-1,4-diisopropylbenzene obtained according to Example 3, 44 g. of tert. butyl hydroperoxide at 80%, and 42 g. of ground anhydrous calcium chloride were introduced into a flask provided with a stirrer.

The solution was then cooled down to —5° C. and over a 5 minute period there were introduced 30 g. of HCl at 36%. Care being taken not to exceed 0° C., the solution was then left under stirring at this temperature for 1 hour. The ether phase was washed with water, then with NaOH at 5%, and then again with water.

The solvent was subsequently removed under vacuum at 30° C., thereby obtaining a residue (76 g.) identified as α-α'-(1-tert.-butyl-peroxy - 4 - tert.-butyl-cyclohexylidene-1-peroxy)-1,4-diisopropylbenzene and having the following characteristics:

Melting point: 32°-34° C.
Iodometric titer: 99.8%
Decomposition temperature: 109° C.
Half life at 121° C.: 30 minutes
C (percent): found 69.6 (calculated 70.75)
H (percent): found 10.5 (calculated 10.40)

EXAMPLE 5

200 cc. of benzene, 81 g. of 1,3-diisopropylbenzene-bis-hydroperoxide-sodium salt at 67%, 33.5 g. of cyclohexanone at 99%, and 25 g. of ground anhydrous calcium chloride were introduced into a flask provided with a stirrer.

The mixture was then cooled down to —10° C. and over a period of 30 minutes there were slowly introduced 80 g. of HCl at 36%. The mixture was then left under stirring for 1 hour at —5° C.

The benzene solution was then washed with water and thereafter was dehydrated with anhydrous sodium sulfate.

The α-α'-(1-hydroxy-cyclohexylidene - 1 - peroxy)-1,3-diisopropylbenzene thus obtained (71 g. determined analytically) was maintained in solution. This product showed the following characteristics:

Iodometric titer: 98%
Decomposition temperature: 55° C.
Half-life at 115° C.: 30 minutes
C (percent): found 68.0 (calculated 68.22)
H (percent): found 9.0 (calculated 9.07)

EXAMPLE 6

Into a flask fitted with a stirrer were introduced 71 g. of α-α'(1-hydroxy-cyclohexylidene-1-peroxy)-1,3-diisopropylbenzene dissolved in 200 cc. of benzene (obtained according to Example 5), 58 g. of tert.-butyl hydroperoxide at 80%, and 45 g. of ground anhydrous calcium chloride.

The benzene solution was cooled down to —10° C. and over a 5 minute period there were introduced 27 g. of hydrochloric acid at 36%. The solution was then left under stirring for 1 hour at —5/0° C. The organic phase was then washed, first with water, then with NaOH at 5%, and then again with water.

The benzene solution was then filtered on a layer of anhydrous sodium sulphate and celite and the solvent was removed under vacuum at 30° C.

Thereby were obtained 91 g. of a product identified as α-α'-(1-tert.-butyl-peroxy-cyclohexylidene-1 peroxy)-1,3-diisopropylbenzene. The product showed the following characteristics:

$d^{20}$: 0.940
$n_D^{25}$: 1.452
Iodometric titer: 98.5%
Decomposition temperature: 113° C.
Half-life at 135° C.: 31 minutes
C (percent): found 67.5 (calculated 67.81)
H (percent): found 9.6 (calculated 9.6)

EXAMPLE 7

Into a flask provided with a stirrer were introduced 200 cc. of benzene, 50 g. of 1,3-diisopropylbenzene-bis-hydroperoxide (sodium salt) at 60%, 15.8 g. of methyl-ethylketone, and 30 g. of ground anhydrous calcium chloride. The mixture was cooled down to —5° to 0° C. and over a 30 minute period there were then slowly introduced 49 g. of HCl at 36%. The mixture was then stirred for 1 hour at 0° C. The benzene solution was washed with water and then dehydrated with anhydrous sodium sulfate.

The α-α'-(2-hydroxy-n-butyliden-2 peroxy)-1,3-diisopropylbenzene thus obtained (37 g. determined analytically) showed the following characteristics:

Iodometric titer: 97%
Decomposition temperature: 50° C.
Half-life at 122° C.; 30 minutes
C (percent): found 65.3 (calculated 64.84)
H (percent): found 9.1 (calculated 9.25)

EXAMPLE 8

Into a flask provided with a stirrer were introduced 37 g. of α-α'-(2-hydroxy-n-butyliden-2-peroxy)-1,3-diisopropylbenzene (obtained according to Example 7), dissolved in 200 cc. of benzene, 40 g. of tert.-butyl hydroperoxide at 75%, and 40 g. of ground calcium chloride. The benzene solution was then cooled down to —5° C. and over a 10 minute period there were introduced 30 g. of hydrochloric acid at 36%. The temperature was allowed to rise to +5° C. and the solution was stirred for 1 hour at this temperature. The benzene phase was then washed with water, then with NaOH at 5%, and again with water.

The solvent was then removed under vacuum at 30° C., thereby obtaining 39.5 g. of a slightly straw-colored liquid residue identified as α-α'-(2- tert.-butyl-peroxy-n-butyliden - 2 - peroxy)-1,3-diisopropylbenzene. This product showed the following characteristics:

$d^{25}$: 0.915
$n_D^{25}$: 1.437
Iodometric titer: 94.6%
Decomposition temperature: 105° C.
Half-life at 114° C.: 30 minutes
C (percent): found 65.8 (calculated 65.34)
H (percent): found 9.7 (calculated 9.79)

EXAMPLE 9

Into a flask provided with a stirrer were introduced 100 cc. of benzene, 100 g. of 1,3-diisopropylbenzene-bis-hydroperoxide (sodium salt) at 60%, 81 g. of 2,6,8-trimethyl-4-nonanone and 30 g. of ground anhydrous calcium chloride. The mixture was then cooled down to —5° C. to 0° C., and over a 30 minute period there were introduced 95 g. of hydrochloric acid at 36%. The temperature rose to +5° C. and the mixture was then left under stirring for 1 hour. The benzene phase was then washed with water and then treated with anhydrous sodium sulfate.

The α-α'-(4-hydroxy - 2,6,8 - trimethyl-nonylidene-4-peroxy)-1,3-diisoprophylbenzene thus obtained (115 g. determined analytically) showed the following characteristics:

Iodometric titer: 94%
Decomposition temperature: 67° C.
Half-life at 107° C.: 30 minutes
C (percent): found 71.7 (calculated 72.68)
H (percent): found 10.9 (calculated 11.18)

EXAMPLE 10

115 g. of α-α'-(4-hydroxy-2,6,8-trimethyl-nonylidene-4-peroxy)-1,3-diisopropylbenzene (obtained according to Example 9) dissolved in 100 cc. of benzene, 79.5 g. of tert. butyl hydroperoxide at 75%, and 40 g. of ground anhydrous calcium chloride were introduced into a flask provided with a stirrer.

The solution was then cooled down to —5° C. and over a 10-minute period there were introduced 40 g. of hydrochloric acid at 36%. Due to the exotherm, the temperature rose to +5° C. and the solution was then left under stirring at +5° C. for 1 hour.

The benzene phase was washed with water, then with NaOH at 5%, and again with water. The solvent was then removed under vacuum at 30° C., thereby obtaining a liquid residue of a slight brownish color which was identified as α-α'-(4-tert.-butyl-peroxy-2,6,8-trimethyl-nonylidene-4-peroxy)-1,3-diisopropylbenzene, which product had the following characteristics:

$n_D^{25}$: 1.4576
Iodometric titer: 92%
Decomposition temperature: 109° C.
Half-life at 116° C.: 30 minutes
C (percent): found 71.3 (calculated 71.50)
H (percent): found 11.1 (Calculated 11.18)

EXAMPLE 11

Into a flask provided with a stirrer there were introduced 300 cc. of benzene, 65.4 g. of 1,4-diisopropylbenzene-bis-hydroperoxide at 95%, 50 g. of cyclododecanone, and 50 g. of ground anhydrous calcium chloride.

The mixture was then cooled down to —10° C. and over a 25 minute period there were introduced 60 g. of hydrochloric acid at 36%. The mixture was stirred for 1 hour at +5° C. The benzene solution was then washed with water and thereafter was dehydrated with anhydrous sodium sulfate.

The α-α'-(1-hydroxy-cyclododecylidene-1-peroxy)-1,4-disopropylbenzene thus obtained (80 g. determined analytically) showed the following characteristics:

Iodometric titer: 98%
Decomposition temperature: 59° C.
Half-life at 114° C.: 30 minutes
C (percent): found 73.3 (calculated 73.17)
H (percent): found 10.3 (calculated 10.58)

EXAMPLE 12

Into a flask provided with a stirrer were introduced 80 g. of α-α'-(1-hydroxy-cyclododecylidene-1-peroxy)-1,4-diisopropylbenzene (obtained according to Example 11) dissolved in 300 cc. of benzene, 66.7 g. of tert.-butyl-hydroperoxide at 66.7%, and 40 g. of ground anhydrous calcium chloride. The benzene solution was then cooled down to 0° C. and over a 10 minute period there were introduced 5 g. of hydrochloric acid at 36%.

The temperature was then allowed to rise to +5° C. and the solution was then stirred for 1 hour at this temperature (+5° C.). The benzene phase was then washed with water, with NaOH at 5%, and then again with water.

The solvent was then removed under vacuum at 40° C., thereby obtaining 48 g. of a yellow liquid residue identified as α-α'-(1-tert.-butyl-peroxy-cyclododecylidene-1-peroxy)-1,4-diisopropylbenzene. The product showed the following characteristics:

$n_D^{25}$: 1.4580
Iodometric titer: 99%
Decomposition temperature: 109° C.
Half-life at 120° C.: 30 minutes
C (percent): found 10.2 (calculated 71.89)
H (percent): found 10.9 (calculated 10.7)

EXAMPLE 13

Into a flask provided with a stirrer, were introduced 50 cc. of benzene, 50 cc. of ethyl ether, 60.6 g. of 1,3-diisopropyl-benzene-bis-hydroperoxide (sodium salt) at 67%, 27.7 g. of benzyl-methyl-ketone at 97%, and 30 g. of ground anhydrous calcium chloride. This mixture was then cooled down to —15° C. and then were slowly added, over a 30 minute period, 60 g. of HCl at 36%. Thereafter the mixture was kept under stirring for 1 hour at —5° C.

The organic solution thus obtained was then washed with water and then was dehydrated with anhydrous sodium sulfate. The product thus obtained (37 g. determined analytically), identified as alpha-alpha'-[2-hydroxy-(3-phenyl)propylidene-2-peroxy] - 1,3-diisopropylbenzene, was kept in solution.

An isolated analytical sample showed the following characteristics:

Iodometric titration: 93.5%
Decomposition temperature: 70° C.
Half-life at 104° C.: 30 minutes
C (percent): found 71.9 (calculated 72.85)
H (percent): found 7.4 (calculated 7.74)

EXAMPLE 14

Into a flask provided with a stirrer were introduced 37 g. of α-α'-[2-hydroxy-(3-phenyl)propylidene-2-peroxy]-1,3-diisopropylbenzene (obtained according to Example 13) dissolved in 50 cc. of benzene and 50 cc. of ether, 45.2 g. of tert.-butyl hydroperoxide at 80%, and 20 g. ground anhydrous calcium chloride. This solution was then cooled down to —5° C. and in over a 10 minute period there were added 20 g. of hydrochloric acid at 36%.

The exothermic reaction caused the temperature to rise to +5° C. and the solution was maintained at this temperature for one hour under stirring. Thereafter the organic phase was washed with water, with NaOH at 5%, and again with water until neutrality.

Then the solvent was removed under vacuum at 50° C., thereby obtaining a slightly opalescent liquid residue (44 g.), identified as α-α'-[2-tert.-butyl-peroxy-(3-phenyl) propylidene-2-peroxy]-1,3 - diisopropylbenzene, having the following characteristics:

$n_D^{20}$: 1.4988
Iodometric titration: 75%
Decomposition temperature: 132° C.
Half-life at 123° C.: 30 minutes
C (percent): found 72.9 (calculated 71.44)
H (percent): found 8.5 (calculated 8.52)

EXAMPLE 15

Into a flask provided with a stirrer were introduced 50 cc. of benzene, 50 cc. of ethyl ether, 21.4 g. of 1,3- diisopropylbenzene-bis-hydroperoxide (sodium salt) at 67%, 19.3 g. of 4-tert.-butyl-cyclohexanone, and 10 g. of ground anhydrous calcium chloride. This mixture was then cooled down and over a 20 minute period there were introduced dropwise 20 g. of HCl at 36%. The mixture was then subjected to stirring for 1 hour at —5° C.

The organic solution was washed with water and was then dehydrated with anhydrous sodium sulfate. The residue (32 g. determined by analysis), identified as α-α'-[1-hydroxy-(4-tert.-butyl) - cyclohexylidene - 1-peroxy]-1,3-diisopropylbenzene, was kept in a solution. An analytical isolated sample showed the following characteristics:

Iodometric titer: 95%
Decomposition temperature: 78° C.
Half-life at 110° C.: 30 minutes
C (percent): found 71.3 (calculated 71.87)
H (percent): found 10.0 (calculated 10.18)

EXAMPLE 16

Into a flask provided with a stirrer were introduced 32 g. of α-α'[1 - hydroxy-(4 - tert.-butyl)cyclohexylidene-1-peroxy]-1,3-diisopropylbenzene, dissolved in 50 cc. of benzene and 50 cc. of ether, and 15 g. of anhydrous calcium chloride. Over a period of 20 minutes there were then introduced into the mixture, at a temperature of —15° C., 43.9 g. of cumene hydroperoxide at 83.4%. The solution was cooled down again to —15° C., and there were introduced 10 g. of HCl at 36% over a 10 minute period. The exothermic reaction caused the temperature to rise to —5° C. and the solution was then left under stirring for one hour at between —5° and 0° C.

The organic phase was washed with water, with NaOH at 5%, and then again with water until reaching neutrality. The solvent was then removed under vacuum at 50° C., thereby obtaining a slightly oily residue, identified as an α-α' - [1 cumyl-peroxy-(tert.-butyl)cyclohexyldiene-1-peroxy]-1,3-diisopropylbenzene, and it showed the following characteristics:

$n_D^{20}$: 1.4985
Iodometric titer: 90%
Decomposition temperature: 114° C.
Half-life at 125° C.: 30 minutes
C (percent): found 75.1 (calculated 74.4)
H (percent): found 8.5 (calculated 8.52)

EXAMPLE 17

200 cc. of n-hexane, 50 g. of 1,3-diisopropylbenzene-bis-hydroperoxide-sodium salt at 60%, 29 g. of acetoacetic acid ethyl ester at 99% and 30 g. of ground anhydrous calcium chloride were introduced into a flask provided with a stirrer. The mixture was then cooled down to —10°-5° C. and over a period of 30 minutes there were introduced 45 g. of HCl at 36%. The mixture was then left under stirring for 1 hour at —5° C. The organic phase was then washed with water and thereafter was dehydrated with anhydrous sodium sulfate. The α-α'-[2-hydroxy-(3-ethoxy-carbonyl)-isopropylidene-2-peroxy]-1,3-diisopropylbenzene thus obtained (43 g. determined analytically) showed the following characteristics:

Iodometric titer: 95%
Decomposition temperature: 47° C.
Half-life at 118° C.: 30 minutes
C (percent): found 60.1 (calculated 59.24)
H (percent): found 7.65 (calculated 7.87)

EXAMPLE 18

Into a flask fitted with a stirrer were introduced 43 g. of α-α'-[2-hydroxy-(3 - ethoxy-carbonyl)-isopropylidene-2-peroxy]-1,3-diisopropylbenzene (obtained according to Example 17) dissolved in 200 cc. of n-hexane, 40 g. of tert.-butyl hydroperoxide at 75% and 40 g. of ground anhydrous calcium chloride. The solution was cooled down to —10° C. and over a 10 minute period there were introduced 30 g. of HCl at 36%. The temperature was allowed to rise to 0° C., and the solution was stirred for 1 hour at this temperature. The organic phase was then washed with water, then with NaOH at 5% and then again with water. The solvent was removed under vacuum care being taken not to exceed 30° C., thereby obtaining 47 g. of slightly yellow-coloured viscous residue identified at α-α'-[2-tert.-butyl-peroxy-(3-ethoxy-carbonyl)-isopropylidene-2 peroxy]-1,3-diisopropylbenzene.

This product showed the following characteristics:

$d^{25}$: 0.937
$n_D^{25}$: 1.489
Iodometric titer: 97%
Decomposition temperature: 109° C.
Half-life at 118° C.: 30 minutes
C (percent): found 61.4 (calculated 60.93)
H (percent): found 8.63 (calculated 8.63)

EXAMPLE 19

In a flask provided with a stirrer were introduced 150 cc. of benzene, 23.5 g. of 1,4-diisopropylbenzene-bis-hydroperoxide at 97.3%, 18 g. of acetoacetic acid ethylester at 99% and 10 g. of anhydrous calcium chloride. The mixture was then cooled down to —10° C. and over a 5 minute period there were introduced 12 g. of HCl at 36%. The mixture was then stirred at this temprature for 1 hour. The benzene phase was washed with water and then treated with anhydrous sodium sulfate.

The α - α' - [2 - hydroxy - (3-ethoxycarbonyl)-isopropylidene-2 peroxy]-1,4-diisopropylbenbene thus obtained (29 g. analitically determined) showed the following characteristics:

Iodometric titer: 97%
Decomposition temperature: 45° C.
Half-life at 115° C.: 30 minutes
C (percent): found 58.6 (calculated 59.24)
H (percent): found 7.43 (calculated 7.87)

EXAMPLE 20

150 cc. of benzene containing 29 g. of α-α'-[2-hydroxy-(3 - ethoxycarbonyl) - isopropylidene - 2 - peroxy]-1,4-diisopropylbenzene (obtained according to Example 19) and 15 g. of anhydrous calcium chloride were introduced into a flask fitted with a stirrer. Over a 20 minute period to —15° C. there were introduced 43.9 g. of tert.-cumyl hydroperoxide at 83.4%. The temperature was maintained to —15° C. and over a 10 minute period there were introduced 10 g. of HCl at 36%. Due to the exothermic reaction the temperature rose to —5° C. and at this temperature the solution was then left under stirring for 1 hour. The organic phase was then washed with water, then with NaOH at 5% and again with water until neutrality. The solvent was removed under vacuum at 30° C. thereby obtaining 38 g. of a slightly oily straw-colored residue identified as α-α'-[2-cumyl-peroxy (3-ethoxy carbonyl) - isopropylidene-2-peroxy]-1,4-diisopropylbenzene having the following characteristics:

$n_D^{20}$: 1.521
Iodometric titer: 93%
Decomposition temperature: 121° C.
Half-life at 122° C.: 30 minutes
C (percent): found 65.3 (calculated 66.82)
H (percent): found 7.32 (calculated 7.74)

EXAMPLE 21

Vulcanization

Vulcanization tests were carried out on mixes of an ethylene-propylene copolymer having a molar ratio ethylene/propylene 50/50 and a viscosity Mooney ML (1÷4) 100° C.=35. In Table 1 there were compared the vulcanization rates determined on the same mixes, containing as peroxides, respectively:

α,α'-(1-tert.-butyl-peroxy-cyclopentylidene-1-peroxy)-1,3-diisopropylbenzene;
α-α'-(1-tert.-butyl-peroxy-4-tert.-butyl-cyclohexylidene-1-peroxy)-1,4-diisopropylbenzene;
α-α'-(1-tert.-butyl-peroxy-cyclohexylidene-1-peroxy)-1,3-diisopropylbenzene;
α,α'-[2-tert.-butyl-peroxy-(3-ethoxycarbonyl)-isopropylidene-2- peroxy]-1,3-diisopropylbenzene;
dicumylperoxide.

The vulcanization rate was determined at 177° C. on a Monsanto TM–10 rheometer. The mixes used in the test were of the following composition:

| | |
|---|---|
| Ethylene-propylene copolymer | parts 100 |
| Carbon black | do 50 |
| ZnO | do 3 |
| Sulfur | do 0.32 |
| Peroxide | mol 0.01 |

Table 2 reports the physical characteristics of vulcanized products obtained by using as peroxides, respectively:

α-α'-(1-tert.-butyl-peroxy-cyclopentylidene-1-peroxy)-1,3-diisopropylbenzene;
α-α'-(1-tert.-butyl-peroxy-4-tert.-butyl-cyclohexylidene-1-peroxy)-1,4-diisopropylbenzene;
α-α'-(1-tert.-butyl-peroxy-cyclohexylidene-1-peroxy)-1,3-diisopropylbenzene;

for vulcanization times between 5 and 60 minutes at 150° C., in comparison with the physical properties of the vulcanized products obtained by using dicumyl peroxide and operating at 165° C. for a vulcanization time of 30 minutes (these being the optimal conditions for said peroxide).

From the results reported in Table 2, it is quite evident that at low temperatures high vulcanization rates and better physical characteristics of the vulcanized product are obtained with the peroxides of the invention as contrasted to the use of dicumyl peroxide.

TABLE 1
Vulcanization rate

| | Parts per 100 g. of ethylene/propylene copolymer | | Vulcanization at the Rheometer | |
|---|---|---|---|---|
| Peroxide type | G. | Moles | Vulcanization temperature, °C. | Vulcanization time, minutes |
| [structure: (CH₃)₃COO—OOC(CH₃)(CH₃)—C₆H₄—C(CH₃)(CH₃)OO—OOC(CH₃)₃ with cyclopentylidene groups] | 5.38 | 0.01 | 177 | 5 |
| [structure: (CH₃)₃COO—OOC(CH₃)(CH₃)—C₆H₄—C(CH₃)(CH₃)OO—OOC(CH₃)₃ with 4-tert-butyl-cyclohexylidene groups] | 6.79 | 0.01 | 177 | 4.5 |
| [structure: (CH₃)₃COO—OOC(CH₃)(CH₃)—C₆H₄—C(CH₃)(CH₃)OO—OOC(CH₃)₃ with cyclohexylidene groups] | 5.66 | 0.01 | 177 | 6 |
| α-α'.2-ter.-butylperoxy(3-ethoxycarbonyl)isopropylidene-2 peroxy]1,3 diisopropylbenzene | 6.3 | 0.01 | 177 | 7 |
| Dicumylperoxide | 2.70 | 0.01 | 177 | 14 |

TABLE 2
Physical characteristics of the vulcanized product

| Peroxide | Parts per 100 g. of ethylene/propylene copolymer | | Vulcanization | | Physical properties of the vulcanized product | | | | |
|---|---|---|---|---|---|---|---|---|---|
| | Moles | G. | Temperature, °C. | Time, minutes | Tensile strength, kg./cm.² | Elongation at break, percent | Modulus at 100%, kg./cm.² | Modulus at 200%, kg./cm.² | Modulus at 300%, kg./cm.² | I.R.H.D. hardness |
| (CH₃)₃COO—[cyclopentyl structure]—COO(CH₃)₃ | 0.01 | 5.38 | 150<br>150<br>150<br>150<br>150 | 5<br>10<br>15<br>30<br>60 | 192<br>198<br>187<br>198<br>186 | 510<br>470<br>410<br>420<br>380 | 23<br>25<br>22<br>23<br>25 | 50<br>55<br>54<br>61<br>68 | 91<br>108<br>104<br>119<br>130 | 65–66<br>66<br>67<br>67<br>67 |
| (CH₃)₃COO—[cyclohexyl structure]—OOC(CH₃)₃ | 0.01 | 6.79 | 150<br>150<br>150<br>150<br>150 | 5<br>10<br>15<br>30<br>60 | 201<br>203<br>202<br>190<br>178 | 350<br>340<br>350<br>330<br>340 | 25<br>27<br>26<br>28<br>25 | 78<br>81<br>75<br>84<br>72 | 165<br>164<br>158<br>168<br>148 | 68–69<br>69<br>69<br>69<br>69 |
| (CH₃)₃COO—[cyclohexyl structure]—OOC(CH₃)₃ | 0.01 | 5.66 | 150<br>150<br>150<br>150<br>150 | 5<br>10<br>15<br>30<br>60 | 199<br>195<br>203<br>202<br>188 | 490<br>460<br>440<br>410<br>400 | 22<br>23<br>24<br>25<br>24 | 54<br>53<br>56<br>63<br>57 | 103<br>104<br>110<br>126<br>123 | 66<br>67<br>67–68<br>68<br>68 |
| Dicumylperoxide | 0.01 | 2.70 | 165 | 30 | 180 | 410 | 21 | 58 | 119 | 68 |

EXAMPLE 22

On a mix having the following composition:

| | | |
|---|---|---|
| Ethylene/propylene copolymer | parts | 100 |
| Carbon black | do | 50 |
| ZnO | do | 3 |
| Sulfur | do | 0.32 |
| α-α'-[2-tert.-butyl peroxy (3-ethoxycarbonyl)-isopropylidene-2-peroxy] - 1,3 - diisopropylbenzene | mol. | 0.01 | the vulcanization test was carried out at 150° C. for 15 minutes. The vulcanized product showed the following physical characteristics:

| | |
|---|---|
| Tensile strength (kg./cm.²) | 185 |
| Elongation at break (percent) | 412 |
| Modulus at 200% (kg./cm.²) | 61 |
| Modulus at 300% (kg./cm.²) | 108 |
| I.R.H.D. hardness | 67–68 |

EXAMPLE 23

Crosslinking

The crosslinking tests were carried out on mixes substantially consisting of low-density polyethylene and peroxide.

In Table 3 there are recorded the physical characteristics of polyethylene crosslinked using the peroxides according to the invention, that is, α-α'-(1-tert.-butyl-peroxy-cyclopentyliden-1-peroxy)-1,3-diisopropylbenzene, α - α'-(1-tert.-butyl-peroxy-4-tert-butyl-cyclohexylidene-1 - peroxy)-1,4-diisopropylbenzene, and the known peroxide (dicumylperoxide).

EXAMPLE 24

The determination of the degree of swelling was carried out on the crosslinked product. By "degree of swelling" is meant the volume of solvent absorbed per unit volume of crosslinked polyethylene.

The method consists of suspending a small basket or cage containing a crosslinked polyethylene plate of about 0.2 g. in a test tube containing 100 cc. of xylene stabilized with 0.1 g. of the phenolic antioxidant 4,4-thio-bis-(3- methyl-6-tert.-butylphenol). The test is carried out for 21 hours at 80° C. The degree of swelling (S) is determined from the following formula:

$$S = 1.07 \cdot \frac{(a-b)-c}{c} + 1$$

wherein:
$a$=weight of the test sample after 21 hours at 80° C. in xylene,
$b$=weight of the test sample before the test,
$c$=weight of the test sample after drying at the end of the test.

$$1.07 = \frac{\text{density of polyethylene at 80° C.}}{\text{density of xylene at 80° C.}}$$

The obtained results, compared with those in which dicumylperoxide was used, are listed in Table 4.

TABLE 3
Crosslinking of low-density (0.918) polyethylene physical characteristics

| Peroxide | Moles of peroxide in 100 g. of polyethylene | Crosslinking | | Yield point, kg./cm.² | Tensile strength, kg./cm.² | Elongation at break, percent |
|---|---|---|---|---|---|---|
| | | Time, minutes | Temperature, ° C. | | | |
| None | | 20 | 145 | 57.8 | 73 | 150 |
| 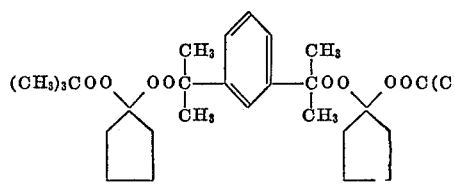 | 0.01 | 20 | 145 | 55 | 150 | 570 |
| 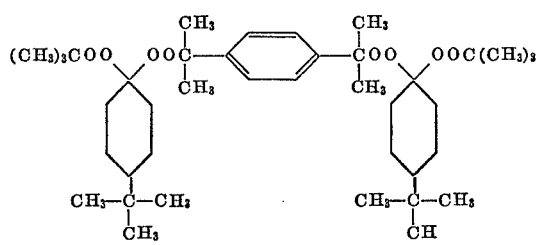 | 0.01 | 20 | 145 | 52.7 | 137 | 260 |
| Dicumylperoxide | 0.01 | 20 | 145 | 52.9 | 132 | 456 |

TABLE 4
Crosslinking of low-density (0.918) polyethylene degree of swelling

| Peroxide | Moles of peroxide in 100 g. of polyethylene | Crosslinking | | Degree of swelling |
|---|---|---|---|---|
| | | Time, minutes | Temperature, ° C. | |
| 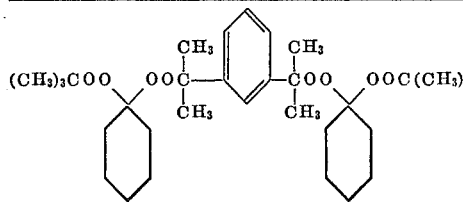 | 0.01 | 20 | 145 | 16.5 |
| 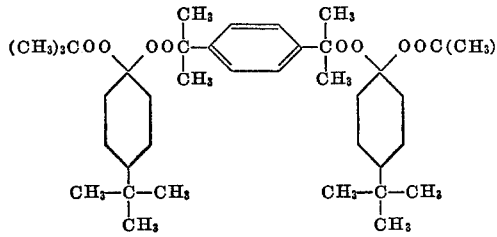 | 0.01 | 20 | 145 | 20.2 |
| Dicumylperoxide | 0.01 | 20 | 145 | 21.3 |

Variations can, of course, be made without departing from the spirit and scope of the invention.

Having thus described our invention, what we desire to secure by Letters Patent and hereby claim is:

1. An organic peroxide of the formula:

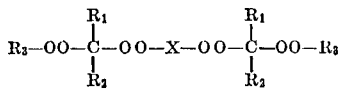

wherein each of $R_1$ is an alkyl group of 1 to 15 carbon atoms, each of $R_2$ is a carbalkoxy alkylene group, wherein each alkylene and alkoxy have 1 to 4 carbon atoms, each of $R_3$ is an alkyl group of 4 to 12 carbon atoms and X is

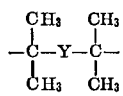

wherein Y is phenylene.

2. An organic peroxide as claimed in claim 1 which is $\alpha$-$\alpha'$-[2 - tert. - butyl peroxy-(3-ethoxy carbonyl)-isopropylidene-2-peroxy]-1,3-diisopropylbenzene.

3. An organic peroxide selected from the group consisting of $\alpha$-$\alpha'$-[2-tert.-butyl peroxy-(3-ethoxy carbonyl)-isopropylidene-2 peroxy]-1,3- diisopropylbenzene; $\alpha$-$\alpha'$-[2-tert.-butyl peroxy-(3-ethoxy carbonyl)-isopropylidene-2 peroxy]-1,4 diisopropylbenzene; $\alpha$-$\alpha'$-[2-cumyl peroxy-(3-ethoxy carbonyl)-isopropylidene-2 peroxy]-1,3- diisopropylbenzene; and $\alpha$-$\alpha'$-[2-cumyl peroxy-(3-ethoxy carbonyl)-isopropylidene-2 peroxy]-1,4 diisopropylbenzene.

References Cited

UNITED STATES PATENTS

| | | | |
|---|---|---|---|
| 3,402,205 | 9/1968 | Gregory | 260—610 |
| 3,254,130 | 5/1966 | Rendtorff et al. | 260—610 |
| 2,802,025 | 8/1957 | Weitbrecht et al. | 260—610 |
| 3,419,577 | 12/1968 | Breckert et al. | 260—610 |
| 3,135,805 | 6/1964 | Gilmont | 260—610 |

LORRAINE A. WEINBERGER, Primary Examiner

E. J. SKELLY, Assistant Examiner

U.S. Cl. X.R.

260—88.2 R, 94.9 GA, 468 K, 473 A, 484 P, 485 H, 485 R, 610 R

PO-1050
(5/69)

UNITED STATES PATENT OFFICE
CERTIFICATE OF CORRECTION

Patent No. 3,775,465          Dated November 27, 1973

Inventor(s) Egeo Sacrini and Claudio Cavallotti

It is certified that error appears in the above-identified patent and that said Letters Patent are hereby corrected as shown below:

Column 1, line 8: "20,839/69" should read -- 20,839 A/69 --.
Column 1, line 18: "where" should read -- wherein --.
Column 1, line 24: "monohydroxide" should read -- mono-hydroperoxide --. Column 1, line 50: "higher than" should read -- above --. Column 1, line 56: "being defined by the general" should read -- having the --. Column 1, lines 58-61:

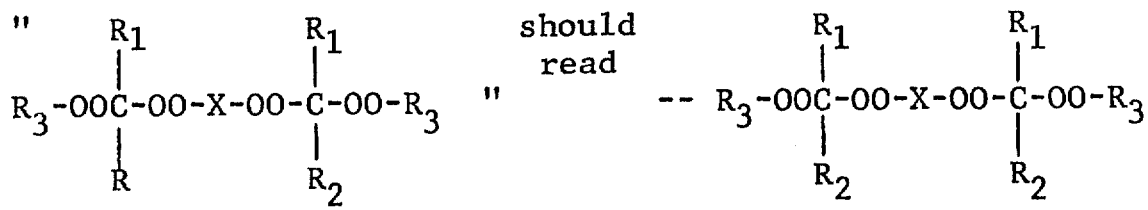

Column 1, line 64: "hydrogen alkyl," should read -- hydrogen; alkyl, --.

Column 2, line 28: "Examples of compounds within the above cited general" should read -- Examples of specific compounds of the above cited --. Column 2, line 48: "proxides," should read -- peroxides, --. Column 2, lines 57-58: "a mono-hydroperoxide of the tertiary type." should read -- a tertiary mono-hydroperoxide. --. Column 2, line 61: "reacting in the first step" should read -- reacting, in the first step, --. Column 2, line 65: "aryl" should read -- aryl, --.

Column 3, line 3: "each alkoxy" should read -- each alkoxy group --. Column 3, lines 8-9: "in which X has the

UNITED STATES PATENT OFFICE
CERTIFICATE OF CORRECTION

PO-1050 (5/69)

Patent No. 3,775,465      Dated November 27, 1973

Inventor(s) Egeo Sacrini and Claudio Cavallotti

It is certified that error appears in the above-identified patent and that said Letters Patent are hereby corrected as shown below:

previously defined meaning" should read -- wherein X is as defined above --. Column 3, lines 21-22: "have the previously defined meanings." should read -- are as defined above. --. Column 3, lines 30-31: "(c) α-α'-(2-hydroxy-2-phenylethyl-2-indene-peroxy)-1,3-diisopropylbenzene;" should read -- (c) α-α'-(2-hydroxy-2-phenylethyl-2-idene-peroxy)-1,3-diisopropylbenzene; --.

Column 3, line 64: "dihydrating" should read -- dehydrating --.

Column 4, line 4: "ethyl-acetacetate; cyclo-ketones" should read -- ethyl-acetocetate; cycloketones --. Column 4, line 6: "cyclo-alkyl-ketones" should read -- cycloalkylketones --. Column 4, line 11: "has the above defined meaning" should read -- is as defined above, --.

PO-1050
(5/69)

UNITED STATES PATENT OFFICE
CERTIFICATE OF CORRECTION

Patent No. 3,775,465  Dated November 27, 1973

Inventor(s) Egeo Sacrini and Claudio Cavallotti

It is certified that error appears in the above-identified patent and that said Letters Patent are hereby corrected as shown below:

Column 5, line 29: "act as" should read -- are --. Column 5, line 55: "to weather" should read -- weather --.

Column 6, line 15: "down to from -15°-10°C." should read -- to from -15° to 10°C. --. Column 6, lines 20-21: "α,α'-(1-hydroxy-cyclopentylidene-1-peroxy)-1,3-diisopropyl-benzene" should read -- α,α'-(1-hydroxy-cyclo pentylidene-1-peroxy)-1,3-diisopropylbenzene --. Column 6, line 22: "showed" should read -- had --. Column 6, line 40: "cooled down to" should read -- cooled to --. Column 6, line 51: "showed" should read -- had --. Column 6, line 69: "cooled down to" should read -- cooled to --.

Column 7, line 4: "showed" should read -- had --. Column 7, line 20: "cooled down to" should read -- cooled to --. Column 7, line 46: "cooled down to" should read -- cooled to --. Column 7, line 54: "showed" should read -- had --. Column 7, line 70: "cooled down to " should read -- cooled to --.

PO-1050
(5/69)

UNITED STATES PATENT OFFICE
CERTIFICATE OF CORRECTION

Patent No. 3,775,465      Dated November 27, 1973

Inventor(s) Egeo Sacrini and Claudio Cavallotti

It is certified that error appears in the above-identified patent and that said Letters Patent are hereby corrected as shown below:

Column 8, line 6: "showed" should read -- had --. Column 8, line 23: "cooled down to" should read -- cooled to --. Column 8, line 29: "showed" should read -- had --. Column 8, line 44: "cooled down to" should read -- cooled to --. Column 8, line 55: "showed" should read -- had --. Column 8, line 71: "cooled down to" should read -- cooled to --.

Column 9, line 5: "showed" should read -- had --. Column 9, line 22: "cooled down to" should read -- cooled to --. Column 9, line 24: "exotherm," should read -- exothermic reaction, --. Column 9, line 49: "cooled down to" should read -- cooled to --. Column 9, line 56: "disopropylbenzene" should read -- diisopropylbenzene --. Column 9, line 57: "showed" should read -- had --. Column 9, line 74: "down to" should read -- to --.

Column 10, line 7: "showed" should read -- had --. Column 10, line 14: "C (percent): found 10.2 (calculated 71.89)" should read -- C (percent): found 70.2 (calculated 71.89) --. Column 10, line 24: "cooled down to" should read -- cooled to --. Column 10, line 34: "showed" should read -- had --. Column 10, line 51: "cooled down to" should read -- cooled to --.

Column 11, line 4: "cooled down and" should read -- cooled and --. Column 11, line 13: "showed" should read -- had --. Column 11, line 32: "cooled down again" should read -- again cooled --. Column 11, line 42: "showed" should read -- had --

-4-

PO-1050
(5/69)

UNITED STATES PATENT OFFICE
CERTIFICATE OF CORRECTION

Patent No. 3,775,465          Dated November 27, 1973

Inventor(s) Egeo Sacrini and Claudio Cavallotti

It is certified that error appears in the above-identified patent and that said Letters Patent are hereby corrected as shown below:

Column 11, line 60: "down to -10°-5°C." should read -- to -10° to 5°C. --. Column 11, line 67: "showed" should read -- had --.

Column 12, line 9: "down to" should read -- to --. Column 12, line 14: "vacuum" should read -- vacuum, --. Column 12, line 17: "at" should read -- as --. Column 12, line 19: "showed" should read -- had --. Column 12, line 30: "In" should read -- into --. Column 12, line 34: "cooled down to" should read -- cooled to --. Column 12, line 40: "peroxy]-1,4-diisopropylbenbene" should read -- peroxy]-1,4-diisopropylbenzene --. Column 12, line 41: "analitically determined) showed" should read -- analytically determined) had --. Column 12, line 55: "stirrer. Over" should read -- stirrer. The mixture was then cooled to -15°C. and over --. Column 12, line 56: delete "to -15°C.". Column 12, line 58: "to" should read -- at --.

Column 13, line 8: "were" should read -- are --.

Column 14, line 22: "temperatures" should read -- temperatures, --.

Columns, 13 and 14, Table 1, at the bottom of the Table: "α-α' 2-ter.-butylperoxy(3-ethoxycarbonyl)isopropylidene-2 peroxy]1,3 diisopropylbenzene" should read -- α-α'[2-ter.-butylperoxy(3-ethoxycarbonyl)isopropylidene-2 peroxy]1,3 diisopropylbenzene --.

PO-1050
(5/69)

UNITED STATES PATENT OFFICE
CERTIFICATE OF CORRECTION

Patent No. 3,775,465          Dated November 27, 1973

Inventor(s) Egeo Sacrini and Claudio Cavallotti

It is certified that error appears in the above-identified patent and that said Letters Patent are hereby corrected as shown below:

Example 22, line 12: "showed" should read -- had --.

Signed and sealed this 29th day of October 1974.

(SEAL)
Attest:

McCOY M. GIBSON JR.           C. MARSHALL DANN
Attesting Officer          Commissioner of Patents